United States Patent [19]

Miller

[11] Patent Number: 5,291,311
[45] Date of Patent: Mar. 1, 1994

[54] APPARATUS AND METHOD FOR GENERATING MULTI-LEVEL OUTPUT VALUES FOR PIXELS IN A HALFTONE CELL

[75] Inventor: Rodney L. Miller, Fairport, N.Y.

[73] Assignee: Eastman Kodak Company, Rochester, N.Y.

[21] Appl. No.: 906,142

[22] Filed: Jun. 29, 1992

[51] Int. Cl.$^5$ ............................................. H04N 1/40
[52] U.S. Cl. .................................... 358/456; 358/457; 358/460
[58] Field of Search ...................... 358/298, 455–460, 358/465, 466

[56] References Cited

U.S. PATENT DOCUMENTS

| | | | |
|---|---|---|---|
| 4,495,522 | 1/1985 | Matsunawa et al. ............... | 358/465 |
| 4,736,254 | 4/1988 | Kotera et al. . | |
| 4,891,714 | 1/1990 | Klees ................................. | 358/456 |
| 4,910,603 | 3/1990 | Hirahara et al. .................. | 358/298 |
| 4,912,562 | 3/1990 | Femester et al. .................. | 358/298 |
| 4,920,501 | 4/1990 | Sullivan et al. . | |
| 4,951,159 | 8/1990 | Van Beek ......................... | 358/455 |
| 4,956,638 | 9/1990 | Larky et al. ...................... | 340/701 |
| 4,992,955 | 2/1991 | Yabuuchi et al. . | |
| 5,014,333 | 5/1991 | Miller et al. ...................... | 382/54 |
| 5,023,729 | 6/1991 | Kumagai ........................... | 358/457 |
| 5,041,920 | 8/1991 | Hayes et al. ...................... | 358/456 |
| 5,050,000 | 9/1991 | Ng ..................................... | 358/298 |

FOREIGN PATENT DOCUMENTS 58-161183 4/1983 Japan .

OTHER PUBLICATIONS

Ulichney, "Digital Halftoning", pp. 71–171 (MIT Press, 1987).

Onishi et al., "The MELFAS 850, A High-Speed Facsimile with a Half-Tone Reproduction Capability", Mitsubishi Denki Giho, vol. 54, No. 8, pp. 46–49 (1980), (English-language Astract supplied).

Primary Examiner—Edward L. Coles, Sr.
Assistant Examiner—Scott A. Rogers
Attorney, Agent, or Firm—Raymond R. Moser; Peter L. Michaelson; William W. Holloway

[57] ABSTRACT

Apparatus and a method for generating a multi-level halftone image (104) from a digitally sampled continuous tone image (101). The apparatus includes a control circuit (140), a preference matrix (150) having as its matrix elements addresses of a plurality of look-up tables (160) and a plurality of look-up tables (160) in the form of a look-up table stack (155). Generally, the control circuit (140) instructs the preference matrix (150) to select a look-up table (160) from the look-up table stack (155) in a pre-defined manner. The selected table (160) is used to convert an intensity value (102) into a multi-level pixel value (106) in the halftone image (104). To accomplish the conversion, each look-up table (160) contains a quantized one-dimensional transfer function (165') having as an input the magnitude of the intensity value (102). The magnitude is mapped into an output level by the transfer function as one of a plurality of available levels. The output level is assigned a pixel location in a halftone cell (103). The look-up table selection is repeated for each element of the preference matrix (150) and the magnitude of each intensity value (102) is mapped into the halftone cell (103) to generate a multi-level halftone image (104).

9 Claims, 10 Drawing Sheets

150 →

| 7 | 6 | 5 | 16 |
|---|---|---|----|
| 8 | 1 | 4 | 15 |
| 9 | 2 | 3 | 14 |
| 10 | 11 | 12 | 13 |

| 1 | 9 | 3 | 11 |
|---|---|---|----|
| 13 | 5 | 15 | 7 |
| 4 | 12 | 2 | 10 |
| 16 | 8 | 14 | 6 |

| 16 | 15 | 14 | 5 | 4 | 3 |
|----|----|----|---|---|---|
| 17 | 18 | 13 | 6 | 1 | 2 |
| 10 | 11 | 12 | 7 | 8 | 9 |
| 5 | 4 | 3 | 16 | 15 | 14 |
| 6 | 1 | 2 | 17 | 18 | 13 |
| 7 | 8 | 9 | 10 | 11 | 12 |

FIG. 6

APPARATUS AND METHOD FOR GENERATING MULTI-LEVEL OUTPUT VALUES FOR PIXELS IN A HALFTONE CELL

TECHNICAL FIELD OF THE INVENTION

The invention relates to apparatus, and an accompanying method, for use in digital halftoning systems, and particularly, to a method and apparatus for generating multi-level halftone images.

BACKGROUND ART

Generally, digital halftoning is accomplished by either bi-tonal or multi-tonal halftoning methods. Bi-tonal halftoning is widely used in the art and is the basic digital halftoning method from which multi-tonal halftoning methods are derived. Therefore, bi-tonal digital halftoning is discussed below as a precursor to a discussion of multi-tonal halftoning.

In general, bi-tonal digital halftoning converts a continuous tone image into a halftone image consisting of a pattern of equal intensity dots. Each dot within the halftone image either exists (black) or does not exist (white), i.e., a bi-tonal image. More specifically, bi-tonal digital halftoning converts a plurality of digitized intensity values representing a continuous tone image into a plurality of halftone cells, where each halftone cell corresponds to each intensity value. Moreover, the number of dots within each halftone cell is proportional to the magnitude of each corresponding intensity value. The intensity values are typically generated by periodically sampling a continuous tone image using an optical scanner. Each intensity value represents the image intensity in an immediate area surrounding the location within the continuous tone image from which the intensity value sample was taken. Typically, each intensity value is quantized into a plurality of levels known as gray scale levels. Quantization permits each intensity value to be represented by a digital value and processed by digital circuitry into a halftone image. For instance, if the intensity value is quantized into 256 levels, i.e., a 256 level gray scale, the intensity value can be represented by an eight-bit digital word.

During bi-tonal digital halftoning, each intensity value is mapped into a spatial area on the halftone image known as a halftone cell. Typically, in a bi-tonal system, each halftone cell comprises a plurality of pixels, each having a bi-tonal value, i.e., either black or white. However, some applications require the number of intensity values to equal the number of pixels in the display cell, i.e., equal scanner and halftone resolutions. Generally speaking, regardless of the application, the arrangement of bi-tonal pixels within the halftone image is perceived by a viewer of the halftone image to have a gray scale intensity commensurate with the magnitude of each associated intensity value. The mapping process is generally known as spatial modulation.

In operation, a bi-tonal digital halftoning system compares each intensity value sample to a matrix of modulation levels and generates a halftone cell corresponding to each intensity value. Typically, the matrix of modulation levels has a number of elements equivalent to the number of pixels in the halftone cell. To generate the bi-tonal halftone cell, a given intensity value is compared to each modulation level in the modulation level matrix. Each pixel in the halftone cell, that corresponds to a modulation level in the modulation level matrix and is lesser in value than the intensity value, is made black; otherwise, the pixel is white. Thus, the intensity value is mapped into an area comprised of an arrangement of black and white pixels whose overall intensity is commensurate with the magnitude of the intensity value.

The arrangement of modulation levels within the modulation level matrix is generally known as dithering, more specifically, clustered dot dithering and dispersed dot dithering. In essence, through dithering the modulation levels are arranged to ensure that the resultant halftone pixels accurately reflect the intensity of the input intensity value. For a discussion of dithering in bi-tonal systems, see Ulichney, *Digital Halftoning*, pp. 71-171 (MIT Press, 1987).

The matrix comparison process is repeated for each intensity value sampled from the original continuous tone image. As a result, the entire image is spatially modulated into a halftone image comprised of a tile-like arrangement of halftone cells each representing an intensity value sample.

As is well known in the art, the previously described halftoning process is useful in halftoning color images by repeating the bi-tonal process for each primary color, i.e., red, blue, and green or cyan, magenta, and yellow, and, subsequently, overlaying the color halftone images with proper registration.

Multi-level halftoning is an extension of bi-tonal halftoning. As its name implies, multi-level halftoning replaces each black or white pixel in a bi-tonal halftone cell with a pixel having a value selected from a number of values available for each pixel. In essence, multi-level halftoning redistributes the intensity of a single intensity value into a plurality of intensity values within a halftone cell. Many display devices permit multi-level pixel display; multi-level halftoning takes advantage of this capability. For example, thermal printers are capable of printing dot sizes that correspond to each pixel intensity level. Additionally, cathode ray tube (CRT) displays can display various pixel intensities by altering an electron beam strength incident upon each pixel within the CRT display.

Typically, display devices are limited as to the number of levels that they can display. In contrast, sampling devices can produce large numbers of output levels. Therefore, multi-level halftoning is used to convert a large number of output levels from a sampling device into a lesser number of levels compatible with a display device. For instance, if a display device can accurately display five levels although a scanner can provide a 256 level intensity value, the multi-level halftoning system must distribute the single 256 level value into a halftone cell containing a plurality of five level pixels that, when viewed, appears as the 256 level value.

To determine the appropriate level for each pixel in a multi-level halftone cell, an input intensity value is compared to a number of modulation level matrices, i.e., N−1 matrices are used to generate N levels. Generally, the comparison process is similar to that used in bi-tonal halftoning except the comparison process is repeated N−1 times for N−1 matrices. As in bi-tonal halftoning, each matrix contains, as matrix elements, a number of modulation levels. The number of matrix elements is equivalent to the number of pixels in the halftone cell. The output of each comparison is a digital bit, i.e., a signal having a value of either a logical "1" or logical "0". The output bit value indicates whether the intensity value was greater than the modulation level, i.e., logical "1", or less than the modulation level, i.e., logical "0". Each output bit is stored in an intermediate matrix. Thus, a set of N intermediate matrices containing digital bits are generated. An encoder combines the elements of the intermediate matrices to generate the pixel values for a halftone cell.

For example, an intensity value may be quantized by an 8-bit scanner to have a value between 0 and 255. The intensity value is compared to four matrices, for instance, containing modulation levels arranged in a 4-by-4 matrix, each matrix having various modulation levels ranging from 0 to 255. Comparing each modulation level in each matrix to the intensity value results in four intermediate matrices containing digital values. The elements of each intermediate matrix are valued at a logical "1" whenever the intensity value is larger than the corresponding modulation level; otherwise, a logical "0" is used as the matrix element. In essence, the four intermediate matrices are four bi-tonal halftone cells. The elements of each intermediate matrix having the same coordinates are combined to form a 4-bit word. Each 4-bit word is then encoded to generate a halftone output value for a pixel in the multi-level halftone cell. The resulting pixel value will range from 0 to 4, i.e., one level for each modulation level matrix with one level to signify the absence of a pixel.

As in the case of bi-tonal halftoning, the modulation levels are placed within each modulation level matrix in a dither pattern. The dither patterns used are essentially the same as those used in bi-tonal halftoning, i.e., clustered-dot dither and dispersed-dot dither.

Currently, the modulation levels in each matrix of a multi-level halftoning system are generated manually, and these levels are arranged using empirical methods to achieve a desired intensity value to halftone cell conversion. The number of modulation levels required to be specified is $(m \times n)(N-1)$, where: N is the number of desired output levels, and m and n are the dimensions in matrix elements of the modulation level matrices. In practice, the number of modulation levels that must be generated can be quite large. For example, a system having 12 output levels with 8-by-8 element matrices requires 64 modulation levels to be specified and properly arranged in each of 11 modulation level matrices.

Moreover, to accomplish each intensity value comparison, $N-1$ comparator circuits associated with $N-1$ modulation level matrices are necessary to produce an N-level output. Thus, a conventional multi-level halftone system requires a dedicated number of comparators and associated matrices to generate each of the output levels. Consequently, each halftoning system must be designed to accommodate a specific number of output levels to drive a specific display device. Thus, flexibility that allows a single multi-level halftone image generating apparatus to be easily altered to accommodate any number of output levels is not available.

Therefore, a specific need exists in the art for apparatus that generates multi-level output values for pixels in a halftone cell in a manner which readily accommodates any number of output levels. Specifically, a need exists in the art for apparatus that generates multi-level values without using an arrangement of comparators and modulation level matrices.

SUMMARY OF THE INVENTION

Accordingly, an object of the present invention is to provide apparatus for performing multi-level halftoning of a continuous tone image.

Another object of the present invention is to generate multi-level pixels in a halftone cell without using a matrix and comparator combination.

These and other objects are accomplished in accordance with the teachings of the present invention by apparatus for generating a multi-level halftone image using a look-up table selection technique. Accordingly, the apparatus includes a control circuit, a preference matrix having, as its matrix elements, addresses of a plurality of look-up tables, and a plurality of look-up tables in the form of a look-up table stack. Generally, the control circuit instructs the preference matrix to select a look-up table from the look-up table stack. The selected table is used to convert an intensity value into a multi-level pixel value. Specifically, the control circuit provides the preference matrix with an address of an element within the preference matrix. The value of the chosen element selects a look-up table from the stack. Subsequently, the chosen look-up table is used to convert an intensity value into a pixel value in a halftone cell. To accomplish the conversion, each look-up table contains a one-dimensional quantized transfer function having, as an input, the magnitude of the intensity value. Through the transfer function this magnitude is then mapped into one of a plurality of available output levels. The output level is assigned a pixel location in a halftone cell. The look-up table selection is repeated for each element of the preference matrix and the magnitude of each intensity value is mapped into the halftone cell. As each intensity value is processed, a halftone cell is generated and positioned such that a halftone image is generated by the accumulation of cells in a tile-like pattern.

BRIEF DESCRIPTION OF THE DRAWINGS

The teachings of the present invention may be readily understood by considering the following detailed description in conjunction with the accompanying drawings, in which:

FIG. 4 depicts an example of a preference matrix for producing a clustered-dot dither;

FIG. 5 depicts an example of a preference matrix for producing a dispersed-dot dither;

FIG. 6 depicts an example of a preference matrix for simultaneously producing two clustered-dot dithers;

To facilitate understanding, identical reference numerals have been used, where possible, to denote identical elements that are common to various FIGURES.

DETAILED DESCRIPTION OF THE INVENTION

Figure 1:
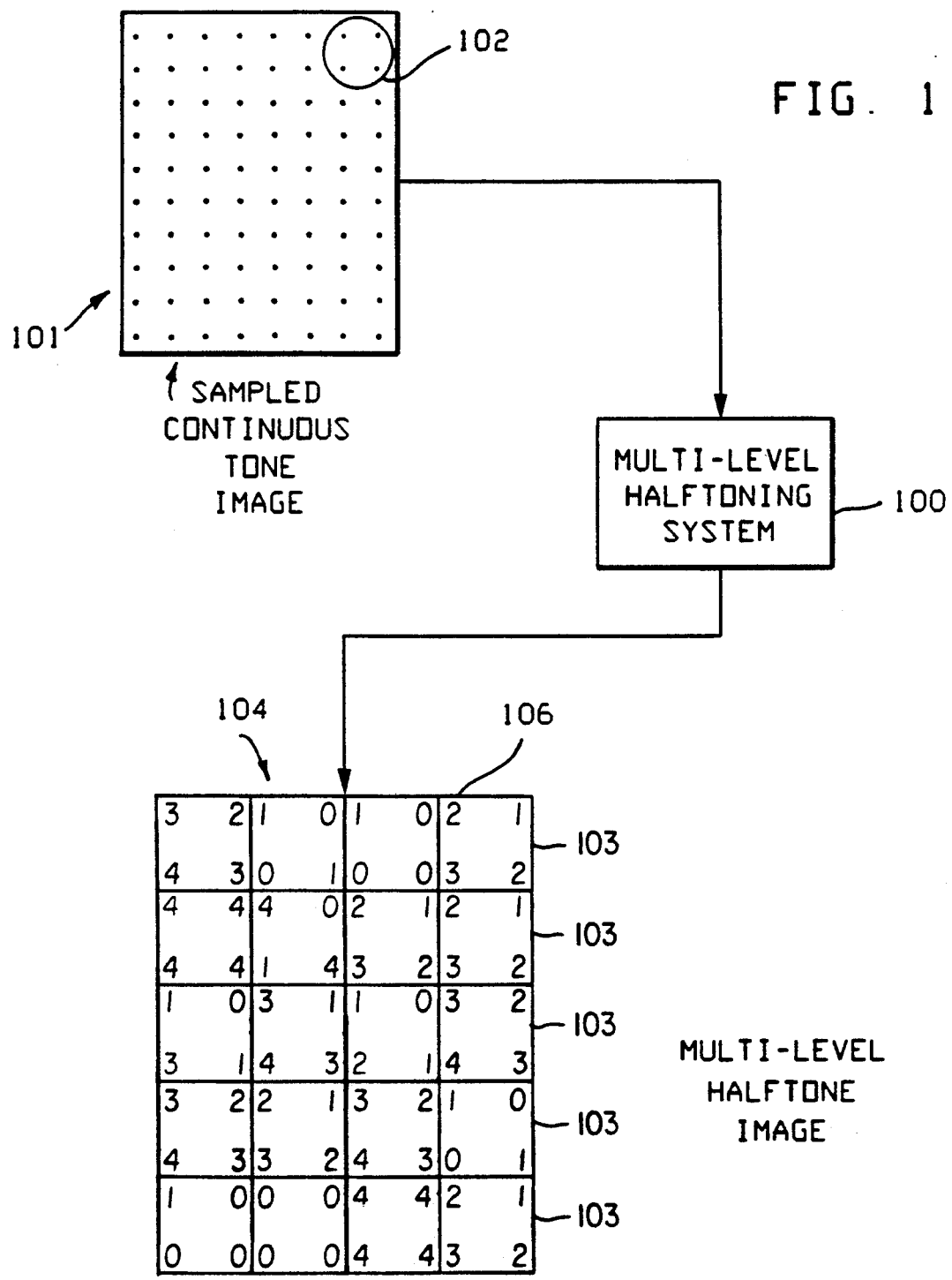
FIG. 1 depicts a block diagram of a system for generating halftone images.

FIG. 1 depicts a high level block diagram of a system for generating multi-level halftone images in accordance with the teachings of the invention. Generally, system 100 converts intensity values 102 of continuous tone image 101 into halftone cells 103 that comprise halftone image 104. The conversion is accomplished by a preference matrix, within system 100, through which one of a plurality of one-dimensional transfer functions is selected to convert intensity values 102 into pixel values 106. Specifically, intensity value 102 are illustratively converted for cell 103 in the upper-right hand location in halftone image 104 into corresponding pixel values "2", "1", "3", and "2". For ease of reference, each individual pixel value will be referred to hereinafter as pixel value 106.

More specifically, each intensity value 102 is generated by periodically sampling continuous tone image 101, quantizing each intensity value sample, generating a digital intensity value representing each intensity value sample, and storing the digital intensity value in memory for future retrieval. The outcome of the intensity value generation process is a digital number representing the image intensity in an area surrounding the sample location. Typically, the intensity value generating process is accomplished by an image scanner or computer graphics generating software. For purposes of the present invention, the particular source of the intensity values is irrelevant.

System 100 converts each intensity value 102 into pixel value 106. Thus, at each intensity value location in original image 101, a pixel value 106 is located in halftone image 104. Cells 103 are positioned in a tile-like arrangement to produce a complete halftone rendition of original continuous tone image 101. In accordance with one aspect of the invention, each pixel value 106 in halftone cell 103 has a multi-level value. As illustratively depicted, each intensity value 102 is mapped into one of four pixels in a 2-by-2 halftone cell 103, where each pixel has one of five levels ranging from 0 to 4.

Figure 2:
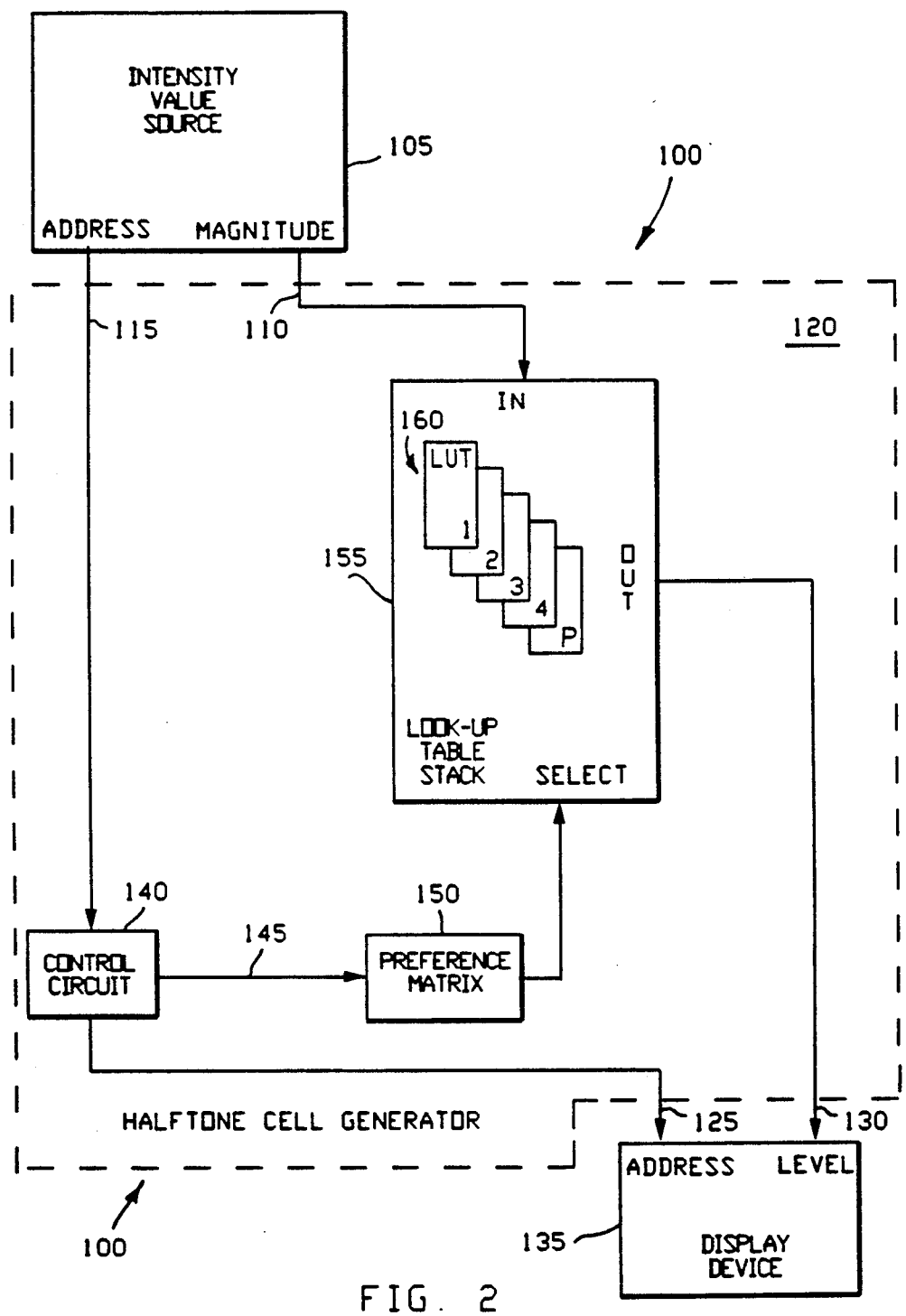
FIG. 2 depicts a detailed block diagram of an embodiment of a system for generating halftone images in accordance with the teachings of the present invention.

FIG. 2 depicts a detailed block diagram of the present invention as it is used in system 100 to generate halftone images. Generally, halftone cell generator 120 converts intensity values provided by intensity value source 105 into multi-level halftone pixel values for display on display device 135. Specifically, intensity value source 105 provides, via lines 115 and 110, an intensity value magnitude and location address to halftone cell generator 120. The intensity values are processed, into a corresponding halftone cell pixel value, by the halftone cell generator in the order in which the intensity values are received, i.e., serially. The address and level of each pixel in the halftone cell is transferred, via lines 125 and 130, to display device 135, such as a cathode ray tube (CRT) monitor or printer.

Halftone cell generator 120 contains look-up table stack 155, preference matrix 150, and control circuit 140. In operation, control circuit 140, in response to an intensity value address, selects a matrix element in preference matrix 150. Subsequently, the value contained at the chosen matrix element selects a specific look-up table from look-up tables 160 situated within stack 155. Each look-up table contains a quantized transfer function that maps the magnitude of the intensity value into a discrete output level. In use, the selected look-up table maps the magnitude of the intensity value into a halftone cell pixel value for display on display device 135.

Figure 3:
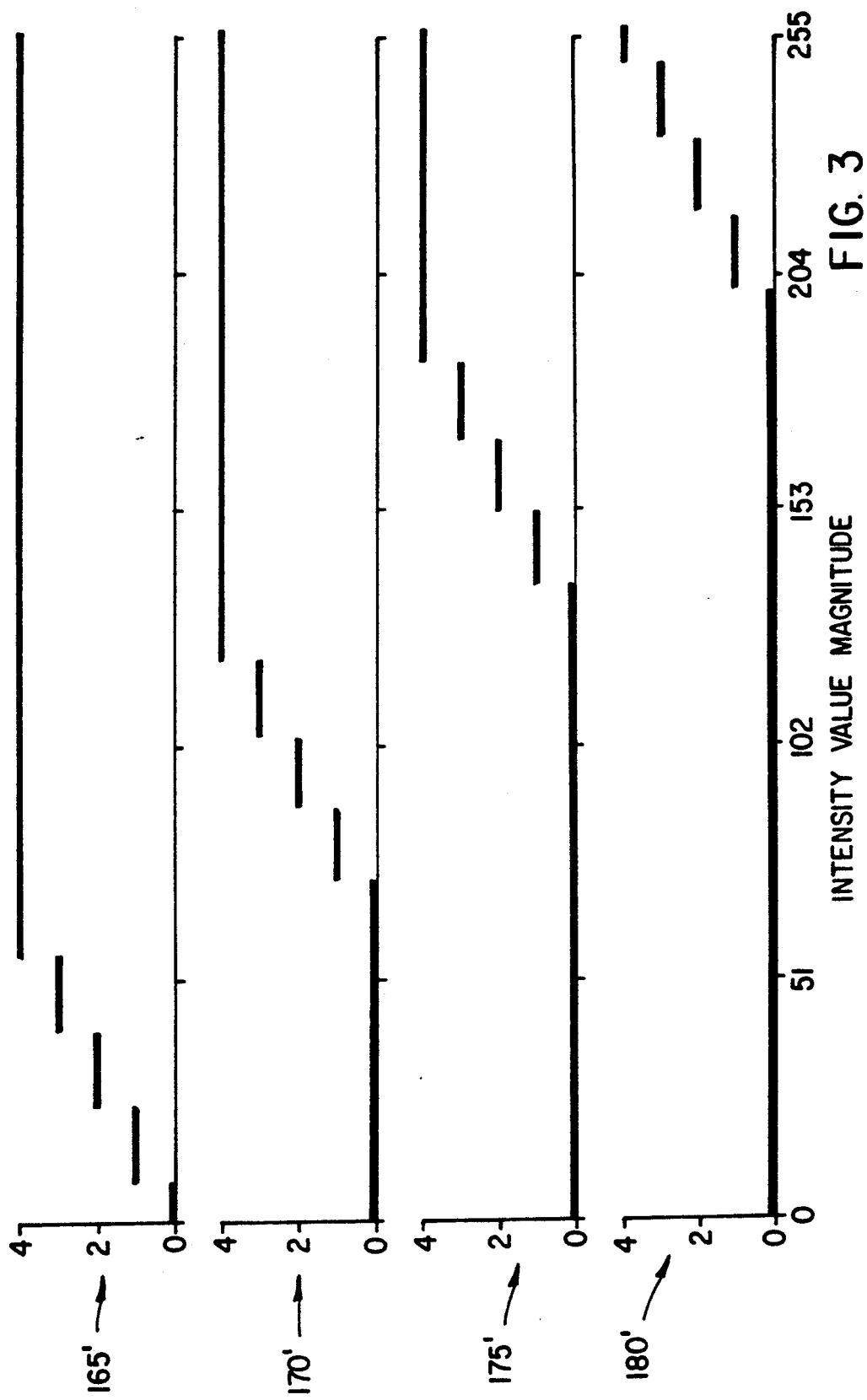
FIG. 3 depicts a set of four high-modulation transfer functions each quantized to produce one of five output levels in response to the magnitude of an intensity value.

For example, FIG. 3 depicts a set of four transfer functions 165', 170', 175', 180' quantized into five levels. The general shape of each transfer function 165', 170', 175', 180' is a quantized linear ramp function. The significance of the transfer function shape is discussed below. For now, it is sufficient to understand that for each intensity value magnitude applied to a given transfer function, a corresponding output level will be generated. For instance, an intensity value of 80 produces a level "4" from function 165', a level "1" from function 170', and a level "0" from function 175' and 180'. Subsequently, each level is used as a pixel value in a multi-level halftone cell. Thus, for a given intensity value, the pixel in a halftone cell can be filled with a multi-level value by selecting an appropriate transfer function.

These four quantized transfer functions 165', 170', 175', 180' are stored in look-up table stack 155, of FIG. 2, as look-up tables 160. Preferably, look-up table stack 155 and preference matrix 150 are stored in random access memory (RAM). As such, look-up tables 160 and preference matrix 150 can be easily reprogrammed to conform to any specific application requirements. Each table 165, 170, 175, and 180 is generally stored as a one dimensional matrix, i.e., 1×N, where N is the number of quantization levels.

The appropriate table 160 used to generate a particular halftone cell pixel value is determined by control circuit 140 and preference matrix 150. Control circuit 140 is generally implemented as a standard microprocessor while preference matrix 150 is stored in RAM. Functionally, control circuit 140 ensures that for each intensity value address (x,y) a halftone cell pixel address (i,j) is generated such that the halftone cells form a tile-like pattern in the halftone image. The halftone cell pixel addresses are transferred, via line 125, to display device 135 to facilitate proper alignment of the cells in the display.

In operation, control circuit 140 accesses, via line 145, the address of each element in preference matrix 150. The specific process by which the elements are selected is discussed below in connection with FIG. 7. Preference matrix 150 defines the size, i.e., the number of pixels, and shape of the halftone cell. Typically, preference matrix 150 has either a rectangular shape or a hexagonal shape. Additionally, the address of each element in the preference matrix corresponds to a pixel location in the halftone cell. The number of elements in preference matrix 150, as well as the halftone cell, is generally unlimited. However, typically, preference matrix 150 contains the same number of elements as there are look-up tables in look-up table stack 155. Illustratively then, each preference matrix element contains a number 1, 2, 3, 4, ..., P, each corresponding to an individual look-up table 160. As each element containing a look-up table address number is addressed by control circuit 140, the look-up table corresponding to the selected number is used as the basis for converting the present intensity value into a multi-level halftone pixel value.

The arrangement of the numbers in preference matrix 150 generally follows well known pixel arrangements that are used in dither matrices to generate bi-tonal halftone cells. Generally, a dither matrix can be of any size as long as the constraint $aP=mn$ is fulfilled; where $a$ is an integer, P is the number of look-up tables 160, m and n define the number of elements in the preference matrix. Typically, either clustered-dot dither or dispersed-dot dither are used. An example of a preference matrix using a clustered-dot dither format having an $a$ of "1" is depicted in FIG. 4. Generally, the first pixel is near the center of the matrix and subsequent pixels are numbered in a spiral pattern radiating towards the outer most pixels, i.e., forming a cluster. An example of a preference matrix using a dispersed-dot dither format having an $a$ of "1" is depicted in FIG. 5. Here, the pixels are dispersed throughout the matrix in an orderly manner. Alternatively, the elements of a dither matrix can address one or more of the look-up tables more than once. For example, a preference matrix which addresses each look-up table twice having a dual clustered-dot dither format and having an $a$ of "2" is depicted in FIG. 6. For an in-depth discussion of the form and function of dither matrices, see Ulichney, *Digital Halftoning*, pp. 77-171 (MIT Press, 1987).

Figure 7:
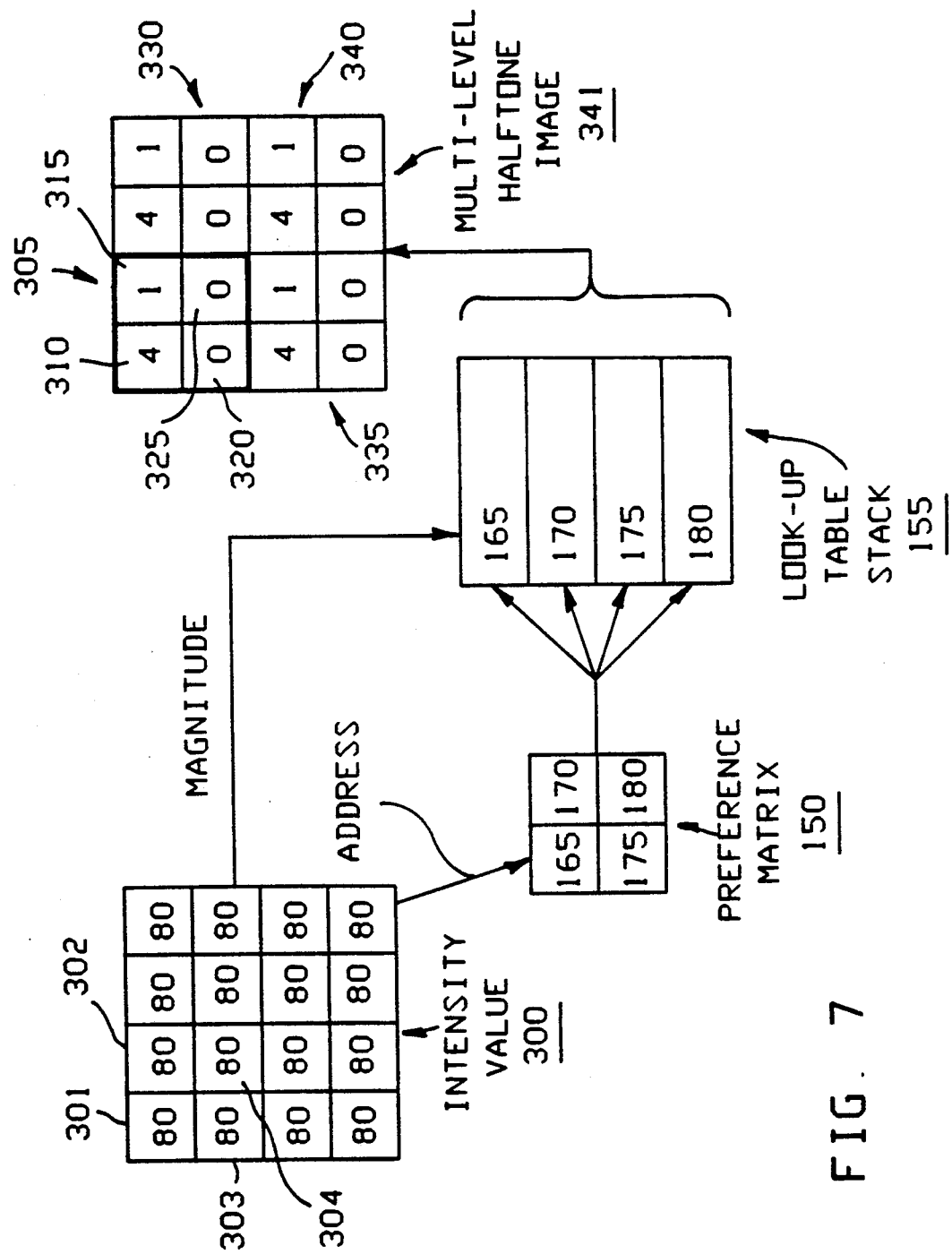
FIG. 7 depicts, in accordance with the teachings of the invention, a flow diagram showing a process by which each intensity value is converted into a single pixel value in a multi-level halftone cell using the transfer functions depicted in FIG. 3.

FIG. 7 depicts, in accordance with the teachings of the invention, a flow diagram of a multi-level halftoning process. In general, intensity values 300 are converted, by a selected look-up table, into a pixel value in halftone image 341. To better explain the operation of the diagram, all intensity values 300 illustratively have a quantized value of "80" out of a possible 256 levels throughout the input area shown, i.e., a constant intensity throughout the area.

In operation, for each intensity value 300, control circuit 140 causes preference matrix 150 to select one of four tables 165, 170, 175, and 180. Specifically, control circuit 140 selects preference matrix elements in the same order, i.e., 165, 170, 175, 180, for each group of four intensity values 300. Thus, when the intensity values are constant, a repetitive pattern of halftone cell pixel values is generated. To accurately accomplish the conversion process, control circuit 140 uses the location address of each intensity value to generate a location address of a corresponding pixel value. Typically, the location of a given intensity value within the continuous tone image corresponds directly to a location of a pixel value in the halftone image generated from the given intensity value. However, in some halftoning system applications, the halftone image may be a scaled and/or rotated version of the continuous tone image. Thus, control circuit 140 would generate scaled or rotated coordinates for the pixel value locations relative to the corresponding intensity value locations.

In response to the magnitude of intensity value 300, the selected table generates a pixel value for a pixel location in halftone cell 305. For example, specific intensity value 301 having a value of "80" generates a "4" as an output of selected table 165 (transfer function 165' in FIG. 3). The level "4" is placed in halftone cell 305 at pixel location 310. Similarly, the output of table 170, "1", derived from intensity value 302 is placed in location 315, the output of table 175, "0", derived from intensity value 303 is placed in location 320, and the output of table 180, "0", derived from intensity value 304 is placed in location 325. These four pixels locations 310, 315, 320 and 325 comprise one halftone cell 305.

Subsequently, the remaining intensity values are processed in a similar manner to generate pixel values for halftone cells 330, 335 and 340. The combination of halftone cells 305, 330, 335, and 340 generate halftone image 341 representative of the continuous tone image area from which the intensity values 300 were sampled.

Figure 8:
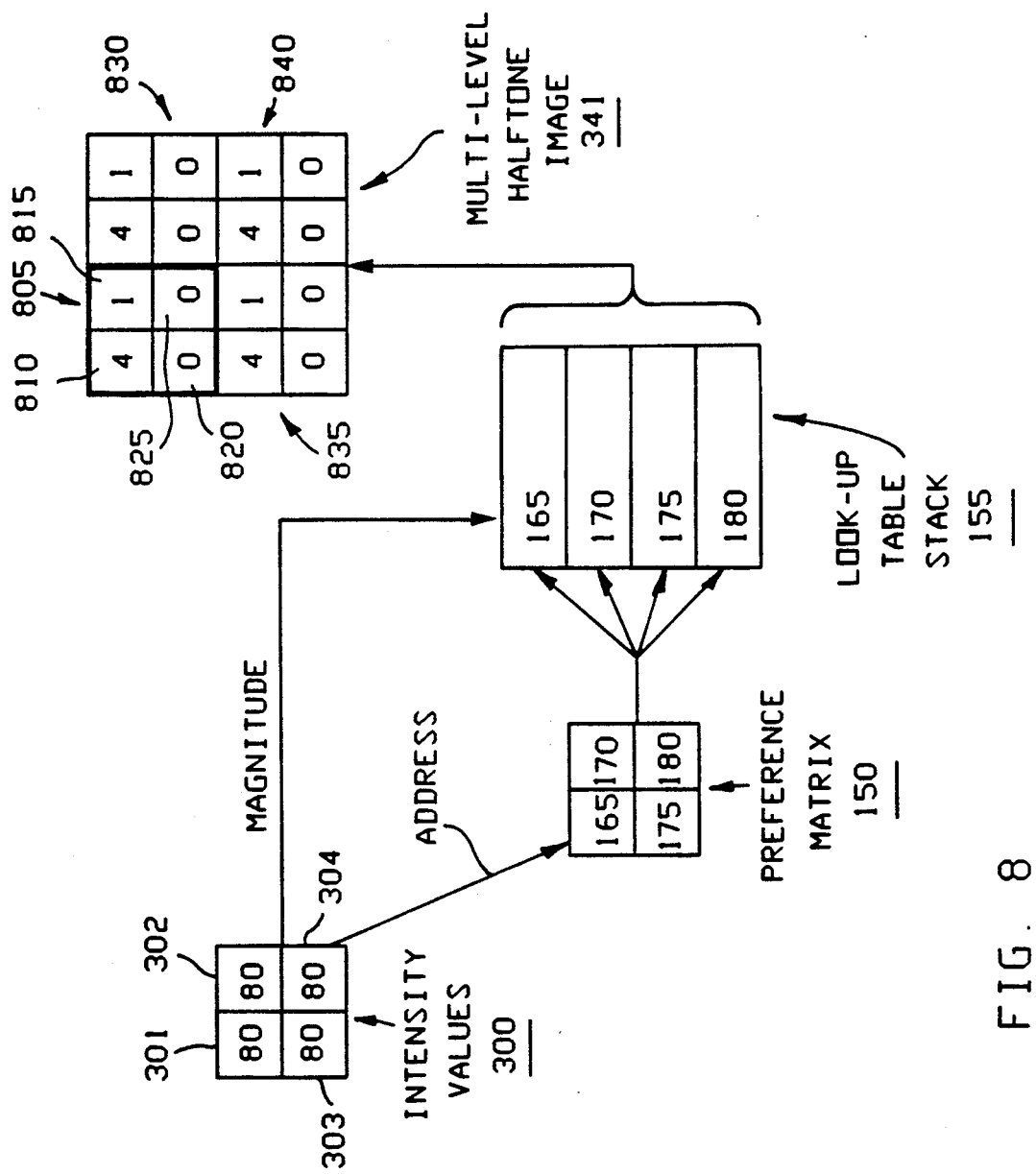
FIG. 8 depicts, in accordance with the teachings of an alternative embodiment of the invention, a flow diagram showing a process by which each intensity value is converted into a plurality of multi-level pixel values comprising each halftone cell using the transfer functions depicted in FIG. 3.

FIG. 8 depicts, in accordance with an alternative embodiment of the invention, a flow diagram for a multi-level halftoning process which generates a plurality of multi-level pixel values in response to each intensity value. By using this alternative embodiment, the multi-level halftone image contains a greater number of pixels than the number of intensity values. In other words, the halftone image resolution is greater than the intensity value source resolution. In contrast, the previously described embodiment converted each intensity value into a single pixel value; thus, the halftone image resolution is the same as the intensity value source resolution.

Generally, in the alternative embodiment, each intensity value is mapped into four pixel values that comprise each halftone cell. Functionally, for each intensity value 300, control circuit 140 causes preference matrix 150 to cycle through all of its elements, thus selecting each of the four tables 165, 170, 175, and 180 in sequence. Upon selection, in response to the magnitude of intensity value 300, each table outputs a level addressed to a pixel in halftone matrix 805. For example, specific intensity value 301 having a value of "80" generates a "4" as an output of table 165. The level "4" is placed in halftone cell 805 at location 810. Similarly, the output of table 170, "1", is placed in location 815, the output of table 175, "0", is placed in location 820, and the output of table 180, "0", is placed in location 825. These four pixels locations 810, 815, 820 and 825 comprise one halftone cell 805 generated from a single intensity value 301.

Subsequently, intensity value 302 is processed in a similar manner as intensity value 301 to generate pixel values for halftone cell 830. Likewise, halftone cells 835 and 840 are generated upon processing intensity values 303 and 304. Each halftone cell 805, 830, 835, and 840 is an area modulated representation of each intensity value 300, i.e., each intensity value 300 is represented by an area consisting of a plurality of pixel values. The combination of halftone cells 805, 830, 835, and 840 generate halftone image 341 representative of the continuous tone image area from which the intensity values 300 were sampled.

Figure 9:
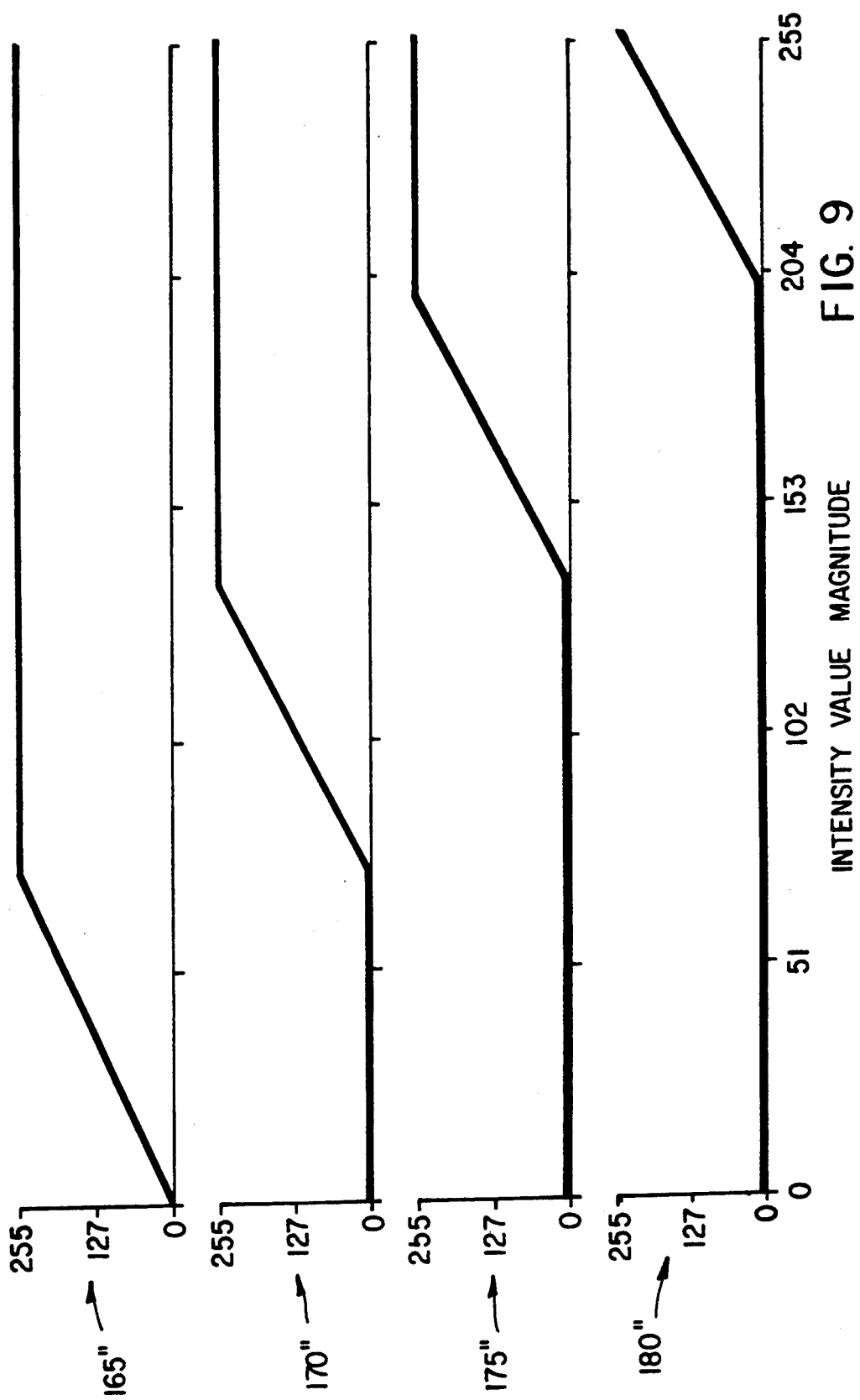
FIG. 9 depicts a set of four high-modulation transfer functions each quantized to produce one of 256 output levels in response to the magnitude of an intensity value.

The forgoing multi-level halftoning examples used one of five levels as halftone cell pixel values. However, those skilled in the art will recognize that any number of levels can be generated merely by quantizing the transfer functions into a greater number of levels. For example, FIG. 9 depicts linear transfer functions 165″, 170″, 175″, 180″ having 256 quantization levels. Transfer functions 165″, 170″, 175″, 180″ can be stored as look-up tables 165, 170, 175, and 180 in lieu of the transfer functions shown in FIG. 3. As compared to the transfer functions shown in FIG. 3, transfer functions 165", 170", 175", 180" shown in FIG. 9 provide an increased number of output levels, i.e., 256 levels versus 5 levels.

Figure 10:
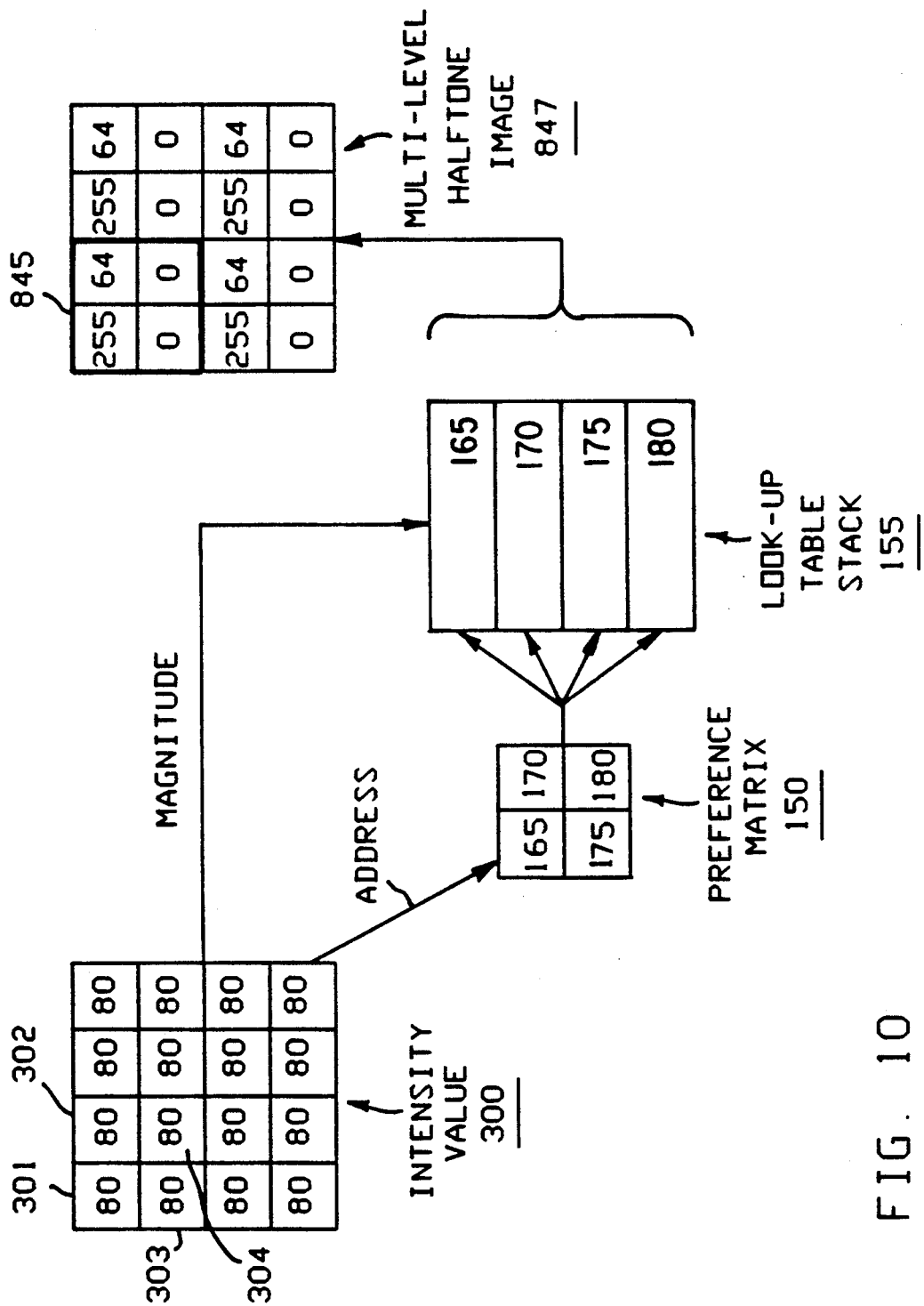
FIG. 10 depicts, in accordance with the teachings of an alternative embodiment of the invention, a flow diagram showing a process by which each intensity value is converted into a single pixel value in a multi-level halftone cell using the transfer functions depicted in FIG. 9.

FIG. 10 depicts, in accordance with another alternative embodiment of the invention, a flow diagram for a multi-level halftoning process using transfer functions 165", 170", 175", 180" of FIG. 9. Look-up tables 165, 170, 175 and 180 are simply reprogrammed to store transfer functions 165", 170", 175", 180" in tabular form. Generally, operation of the invention is substantially similar to the operation of previous embodiments. However, the increased quantization levels cause each intensity value 300 to be mapped into four pixels that can each have a value ranging from 0 to 255. When the intensity value 300 has a value of "80", the output of look-up table 165 is "255", the output of table 170 is "64", and the outputs of tables 175 and 180 are "0". The halftone image resulting from sixteen intensity values having a value of "80" is shown in halftone image 847.

The manner in which the halftone cells are filled with multi-level pixel values is regulated by both the arrangement of elements in the preference matrix and the shape of the transfer functions stored in the look-up tables selected by the preference matrix. As discussed previously, the elements in the preference matrix are typically arranged in traditional clustered-dot dithering or dispersed-dot dithering patterns. These patterns of matrix elements define which look-up table will be used to generate a multi-level pixel value at a specific location in the halftone cell, while the shape of the transfer functions stored in each look-up table control the manner in which each individual pixel value is determined.

For example, as the magnitude of the intensity values are incrementally increased from a value of "0" towards a value of "255", the transfer functions depicted in FIGS. 3 and 9 generate a halftone cell by initially producing an incrementally increasing multi-level pixel value with functions 165' or 165". The output of all the other transfer functions remains "0". As the intensity values increase, function 165' produces a maximum pixel value of "4" before function 170' produce a pixel value greater than "0", and function 165" produces a maximum pixel value of "255" before function 170" produces a pixel value greater than "0". More specifically, in FIG. 7, as intensity values 300 increase in magnitude, pixel 310 of halftone cell 305 obtains a maximum value of "4" before pixel 315 obtains a value of "1". Similarly, as the magnitude of intensity values 300 increase further, the value of pixel 315 increases to a maximum value of "4" before the value of pixel 320 begins to increase. This characteristic is indicative of high-modulation halftoning. The transfer functions depicted in FIGS. 3 and 9 are examples of high-modulation halftoning transfer functions. Alternatively, the transfer functions can overlap, such that, as the intensity values increase in magnitude, a second pixel in the halftone cell begins increasing in value prior to any of the other pixels in the halftone cell attaining a full value.

Figure 11:
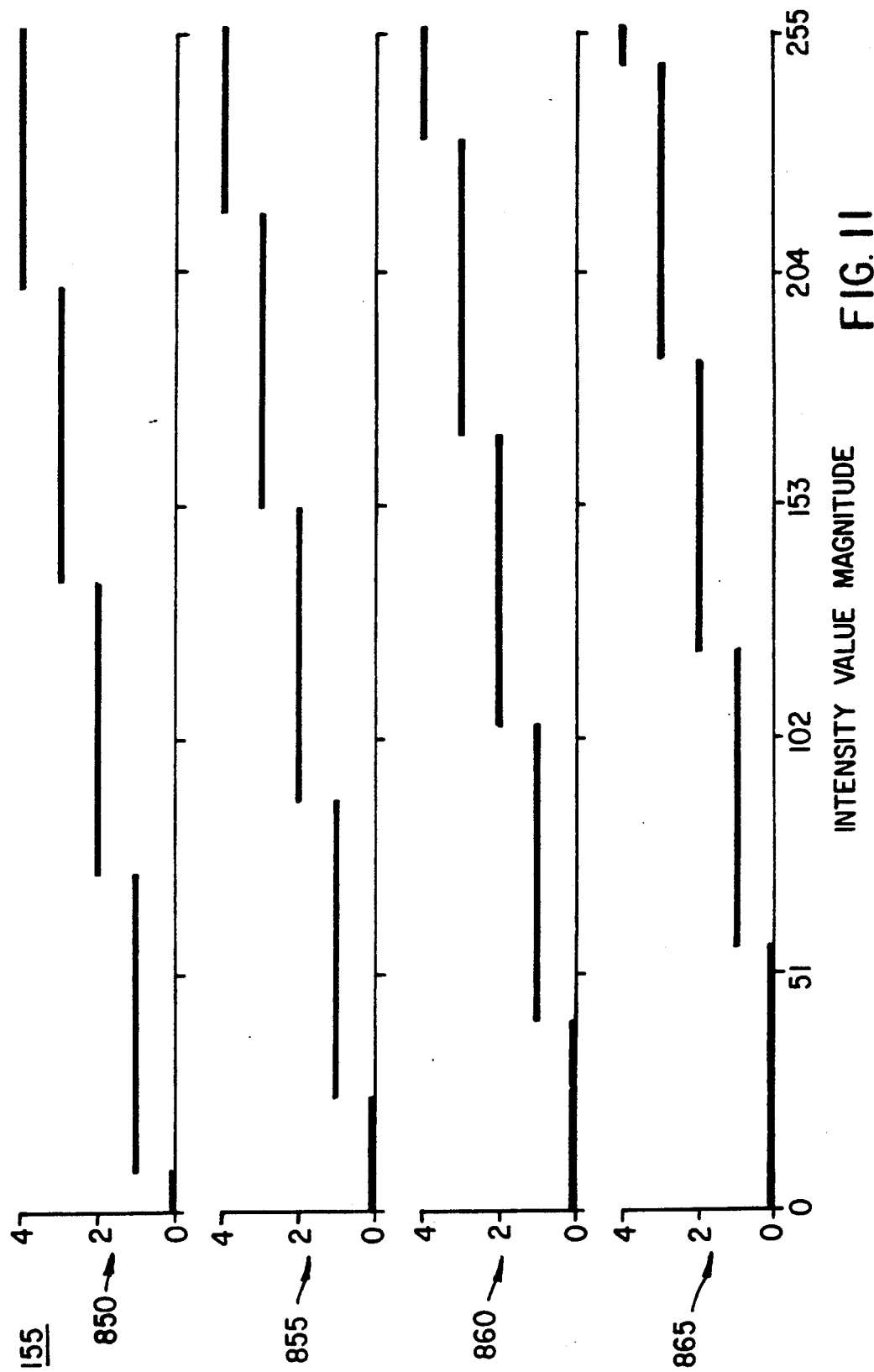
FIG. 11 depicts a set of four low-modulation transfer functions each quantized to produce one of five output levels in response to the magnitude of an intensity value.

In contrast to the high-modulation halftoning transfer functions, FIG. 11 depicts low-modulation halftoning transfer functions. Here, transfer functions 850, 855, 860, and 865 ensure that, as the intensity values increase, all the pixels in a halftone cell attain the same value prior to increasing any one pixel value above the value of its neighbor pixels.

Figure 12:
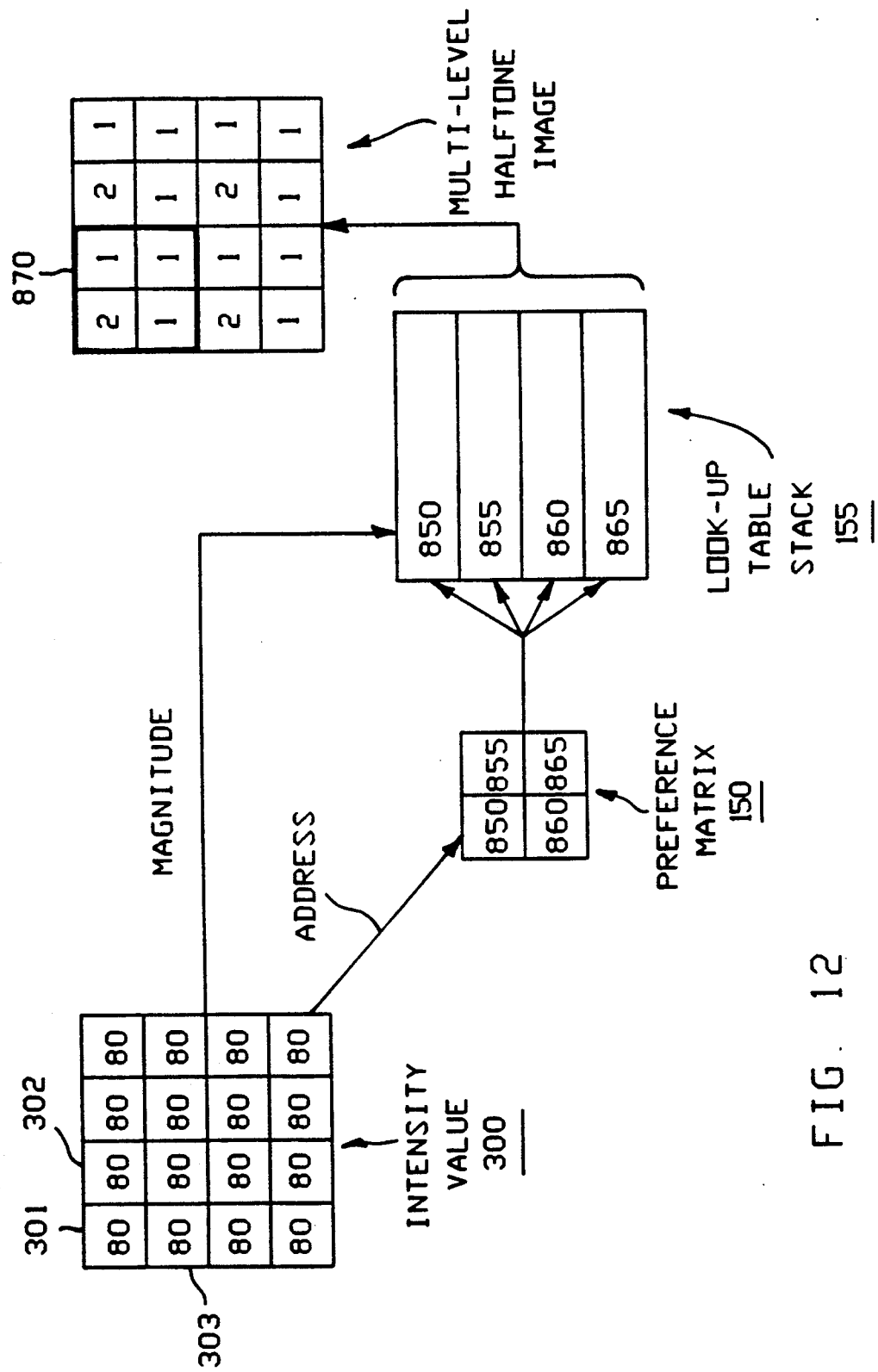
FIG. 12 depicts, in accordance with the teachings of another alternative embodiment of the invention, a flow diagram showing a process by which each intensity value is converted into a single pixel value in a multi-level halftone cell using the transfer functions depicted in FIG. 11.

FIG. 12 depicts a flow diagram of a multi-level halftoning process using low-modulation transfer functions 850, 855, 860, and 865 of FIG. 11. As depicted in FIG. 12, as intensity values 300 increase in magnitude, all the pixels in a halftone cell 870 must attain the same value prior to an increase in value of any one of these pixels. Of course, as with the tables of FIG. 3, any number of quantization levels may be used as defined by the application.

Although a number of embodiments of the present invention have been shown and described in detail herein, many other varied embodiments that incorporate the teachings of the invention may be easily constructed by those skilled in the art.

We claim:

1. In a multi-level halftoning system (100), apparatus (120) for generating a multi-level pixel value for a halftone cell (103) from a magnitude of an intensity value (102) at a given location address, said apparatus comprising:

means (155), responsive to the magnitude of said intensity value, for producing a modulation level as said multi-level pixel value, wherein said producing means comprises a plurality of look-up tables (160) each having values representing a pre-defined transfer function (165', 170', 175' 180');

preference matrix means (150) connected to said producing means, for in response to said given location address, selecting one of said plurality of look-up tables said preference matrix means having, as its matrix elements, values representative of the address of said plurality of look-up tables, and means (140), connected to said selecting means, for controlling said selection such that one look-up table is selected in a pre-defined manner to produce a modulation level as said multi-level pixel value.

2. The apparatus of claim 1 wherein each said transfer function is quantized into a plurality of levels, whereby each quantization level is a modulation level.

3. The apparatus of claim 1 wherein said halftone cell comprises a plurality of multi-level pixel values (106) and wherein said controlling means further comprises means for generating (140) a plurality of multi-level pixel values from said intensity value magnitude.

4. The apparatus of claim 3 wherein said generating means comprises means (140) for repetitively controlling said selection by said preference matrix means of said plurality of look-up tables such that said intensity value magnitude is applied to each selected look-up table to produce a plurality of modulation values as said multi-level pixel values in said halftone cell.

5. The apparatus of claim 1 wherein said preference matrix having a plurality of matrix elements defines a number of pixel locations in said halftone cell.

6. In a multi-level halftoning system, a method for generating a multi-level pixel value for a halftone cell from an intensity value at a given location address and having a magnitude, said method comprising the steps of:

in response of said given location address, selecting one of a plurality of look-up tables, wherein each said look-up table contains values representing a pre-defined transfer function said one of a plurality of look-up tables being selected in preference matrix means having, as its matrix elements, values representative of address of said plurality of look-up tables;

controlling said selection such that one look-up table is selected in a pre-defined manner; and producing, in response to the magnitude of said intensity value, a modulation level as said multi-level pixel value.

7. The method of claim 6 wherein each said transfer function is quantized into a plurality of levels, whereby each quantization level is a modulation level.

8. The method of claim 1 wherein said halftone cell comprises a plurality of multi-level pixel values and wherein said method further comprises the step of generating a plurality of multi-level pixel values from said intensity value magnitude.

9. The method of claim 8 wherein said generating step further comprises the step of repetitively controlling said look-up table selection such that the intensity value magnitude is applied to each selected look-up table to produce a plurality of modulation levels as said multi-level pixel values in said halftone cell.

* * * * *